United States Patent [19]
Albrecht et al.

[11] Patent Number: 5,523,638
[45] Date of Patent: Jun. 4, 1996

[54] SHAFT MOUNTED EDDY CURRENT DRIVE WITH ROTARY ELECTRICAL CONNECTOR

[76] Inventors: James W. Albrecht, 1959 Woodson Ct., Dayton, Ohio 45459; James R. Boone, 510 B. Avenue J East, Grand Prairie, Tex. 75050; Larry D. Best, Rte. 3, Box 317, Springtown, Tex. 76082

[21] Appl. No.: 321,269

[22] Filed: Oct. 11, 1994

[51] Int. Cl.$^6$ ............................................. H02K 13/10
[52] U.S. Cl. ...................... 310/219; 310/232; 310/105; 310/95
[58] Field of Search ........................ 310/92–95, 103, 310/105, 107, 219, 227, 232, 248, 52, 53, 58, 60 R, 60 A

[56] References Cited

U.S. PATENT DOCUMENTS

| | | | |
|---|---|---|---|
| 3,056,895 | 10/1962 | Cohen et al. | 310/96 |
| 3,233,131 | 2/1966 | Stegman | 310/105 |
| 3,601,643 | 8/1971 | Krulls | 310/219 |
| 3,619,681 | 11/1971 | Ginkel | 310/232 |
| 3,870,914 | 3/1975 | Walker | 310/219 |
| 4,379,242 | 4/1983 | MacDonald | 310/105 |
| 4,400,638 | 8/1983 | Albrecht et al. | 310/95 |
| 4,410,819 | 10/1983 | Kobayashi et al. | 310/105 |

OTHER PUBLICATIONS

"Mercury Rotating Electrical Connectors", Mercotac Inc. 4 pages.

*Primary Examiner*—Mark O. Budd
*Attorney, Agent, or Firm*—James E. Bradley; Mark W. Handley

[57] ABSTRACT

An electric variable speed drive includes a hub member, a driven member, a magnetic coupler, and a rotary electrical connector. The hub member is mounted for rotating with the shaft of a prime mover. The driven member is rotatably supported on the hub member by bearings, and includes a mechanical output portion such as a pulley. The magnetic coupler includes an electric coil and magnetic poles which are mounted for rotating with one of the hub and the driven members. An armature is mounted to the other of the hub and driven members. An electric current is passed through the electric coil to magnetically couple the hub member to the driven member. The extent of the magnetic coupling between the hub and driven members is determined by the electric current passing through the electric coil. The rotary electrical connector includes a conductive fluid, such as liquid mercury, which extends between stationary and rotary contacts for passing the electric current from a stationary power source to the rotating electric coil. A fan and heater maintain the temperature of the rotary electrical connector between minimum and maximum operating temperature limits. Insulation prevents heat generated in operating the drive from raising the temperature of the rotary electrical connector.

30 Claims, 2 Drawing Sheets

5,523,638

SHAFT MOUNTED EDDY CURRENT DRIVE WITH ROTARY ELECTRICAL CONNECTOR

BACKGROUND OF THE INVENTION

1. Field of the Invention

This invention relates in general to electric variable speed drives for variably coupling a mechanical load to a prime mover, and in particular to shaft mounted eddy current drive for providing a variable magnetic coupling between a driven member and a prime mover.

2. Description of the Prior Art

Electric variable speed drives, and in particular eddy current drives, have been used to selectively determine the extent of coupling between a prime mover and a mechanically driven load. One example of an electric variable speed drive is the shaft mount eddy current drive disclosed in U.S. Pat. No. 4,400,638, invented by James W. Albrecht, et al., and issued to Stromag, Inc., on Aug. 23, 1983.

Eddy current drives effect a variable magnetic coupling between an input member and a driven member by means of an electric coil, which is mounted for rotating with one of the input and driven members. The input member and shaft of the prime mover are coupled for rotating at fixed speeds. The driven member includes a mechanical output drive portion which is directly coupled to the mechanically driven load for operating the load at speeds which correspond to speeds of the driven member. The speeds at which the driven member rotates are determined by the extent of magnetic coupling between the input member and the driven member, and the extent of the magnetic coupling is determined by electric current passing through the electric coil.

Prior art eddy current drives typically have solid brushes and slip rings for passing the electric current from a stationary power source to the rotating electric coil. The slip rings, or commutator rings, are mounted for rotating with the member which includes the electric coil. The solid brushes, which are usually made of carbon, are held in a stationary position and pressed against the rotating slip rings to electrically connect between the electric coil to the stationary power source. Force must be applied to press to the solid brushes against the slip rings to assure that an adequate electrical connection is maintained.

Pressing solid brushes against rotating slip rings causes the brushes to wear and require replacement. Excessive force may also deteriorate slip rings. Thus, prior art eddy current drives having solid brushes and slip rings require periodic maintenance to replace worn brushes and repair damaged slip rings. Often, brushes have to be replaced after only several months of use.

SUMMARY OF THE INVENTION

An electric variable speed drive includes a hub member, a driven member, a magnetic coupling means, and a rotary electrical connector. The hub member is mounted for rotating with the shaft of a prime mover. The driven member is rotatably supported on the hub member by a bearing means, and includes a mechanical output portion such as a pulley. The magnetic coupling means includes an electric coil and magnetic pole means which are mounted for rotating with one of the hub and the driven members, and an armature mounted to the other of the hub and driven members. An electric current is passed through the electric coil to magnetically couple the hub member to the driven member. The extent of the magnetic coupling between the hub and driven members is determined by the electric current passing through the electric coil. The rotary electrical connector includes a conductive fluid, such as liquid mercury, which extends between stationary and rotary contacts for passing the electric current from a stationary power source to the rotating electric coil. A fan and heater means maintain the temperature of the rotary electrical connector between minimum and maximum operating temperature limits. An insulation means prevents heat generated in operating the drive from raising the temperature of the rotary electrical connector.

DETAILED DESCRIPTION OF THE PREFERRED EMBODIMENT

Figure 1:
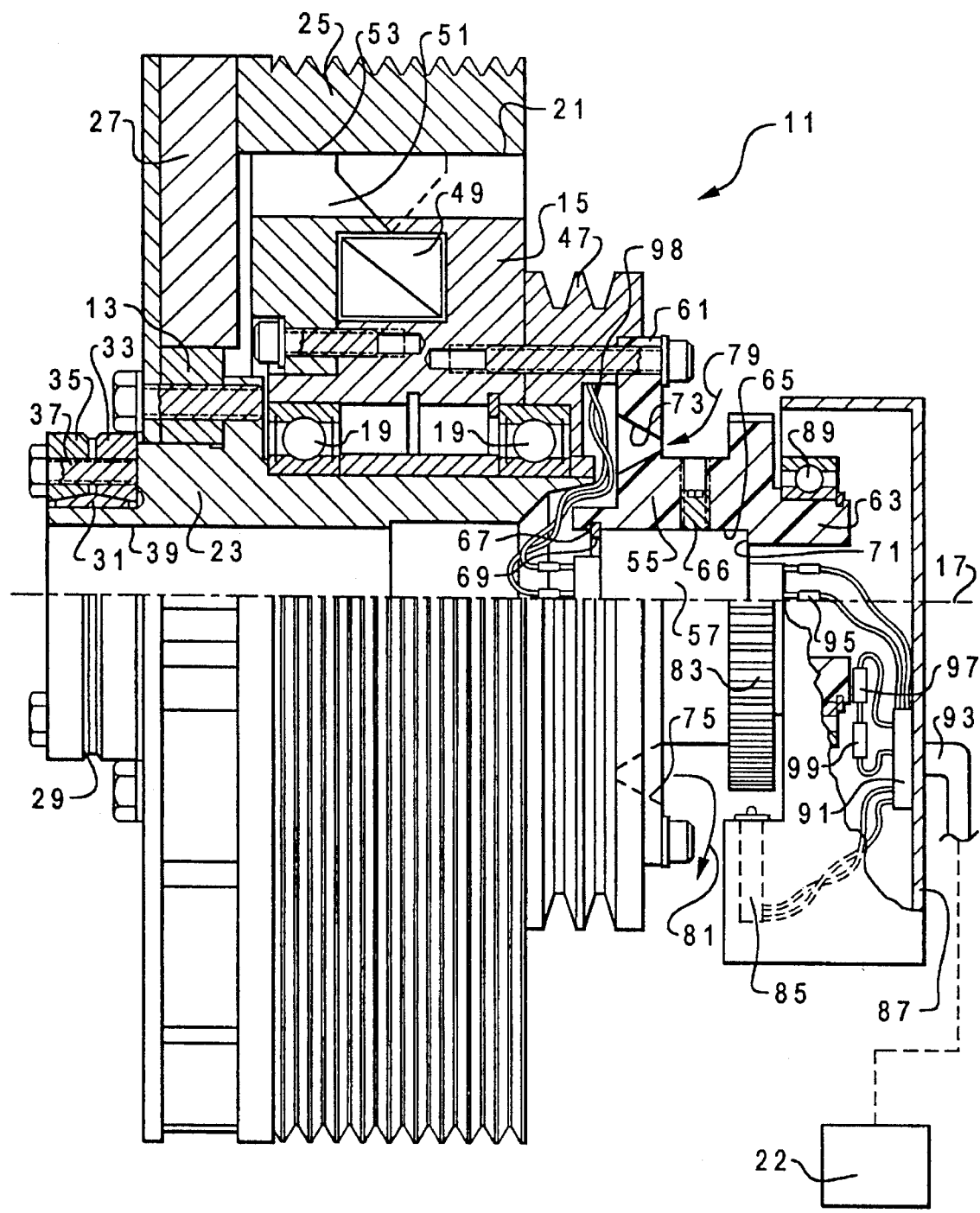
FIG. 1 is a one-quarter longitudinal section view which schematically depicts and electric variable speed drive of the present invention.

FIG. 1 is a longitudinal section view which schematically depicts electric variable speed drive 11 of the present invention. Electric variable speed drive 11 is an eddy current drive which includes input member 13 and driven member 15, which provides an output member. Input member 13 and driven member 15 are rotatably connected for rotating about central axis 17 by two bearing means 19. Electric variable speed drive 11 also includes magnetic coupling means 21, or magnetic coupler, for providing a variable magnetic coupling between input member 13 and driven member 15. The extent of the magnetic coupling between input member 13 and output member 15 is determined by an electric current provided by stationary power source 22 and passed to magnetic coupling means 21.

Input member 13 is comprised of hub member 23 having armature portion 25 and fan blades 27. Armature portion 25 is provided by a solid iron armature. A mechanical input drive portion 29 is included on one end of hub member 23. Mechanical input drive portion 29 in this embodiment of the present invention is a shrink disc assembly for mounting to a motor shaft, but in other embodiments may be other types of couplings, such as a pulley or gear. Hub member 23 is adapted for mounting to the shaft of the prime mover, such as a motor shaft. Input drive portion 29 includes tapered sleeve 31 and two tapered rings 33 and 35, which are coupled together by bolts 37. Typically six bolts 37 are used to draw tapered rings 33 and 35 together on top of two oppositely inclined exterior surfaces of tapered sleeve 31. Pulling the interior inclined surface of tapered rings 33 and 35 on top of the two oppositely inclined exterior surfaces of tapered sleeve 31 causes tapered sleeve 31 to reduce in diameter and press against an end portion of hub member 23. Shrinking the interior diameter 39 of the end portion of the hub member 23 clamps hub member 23 to the motor shaft. Further, key ways and key, which are not shown, may be used for preventing relative rotation between the motor shaft and hub member 23.

Driven member 15 includes a mechanical output drive portion 47, which in this embodiment of the present invention is a pulley sheave. An electric coil 49 is included within driven member 15, and magnetic pole means 51 are mounted exteriorly about electric coil 49. Magnetic pole means 51 extend toward armature portion 25 of input member 13 and defines a small air gap 53 therebetween.

A mounting means is provided by support bracket 55 for securing rotary electrical connector 57 to driven member 15. Rotary electrical connector 57 is provided for passing electric current from a stationary power source to rotating electric coil 49. Support bracket 55 includes plate portion 61 and cylindrical portion 63. Cylindrical portion 63 has a central bore 65 extending therethrough into which rotary electrical connector 57 is secured. Snap ring groove 67 extends interiorly within central bore 65 for receipt of snap ring 69 to hold the body of rotary electrical connector 57 against shoulder 71 formed into the interior of central bore 65. Allen screw 66 extends within cylindrical portion 63 and into central bore 65 for pressing against rotary electrical connector 57 to prevent rotation between connector 57 in support bracket 55.

Support bracket 55 is formed from glass filled polyester to provide an insulation means for preventing heat generated in operating drive 11 from transferring to rotary electrical connector 57. Operating temperatures for output pulley 47 and driven member 15 may often approach 200° F., which is above the maximum operating temperature limit for rotary electrical connector 57. A thermoplastic composite was chosen to form support bracket 55, rather than thermally conductive metals, to prevent heat transfer from hot portions of drive 11 to rotary electrical connector 57. However, other types of insulation materials may also be used to provide an insulation means for preventing heat transfer to rotary electrical connector 57.

Figure 2:
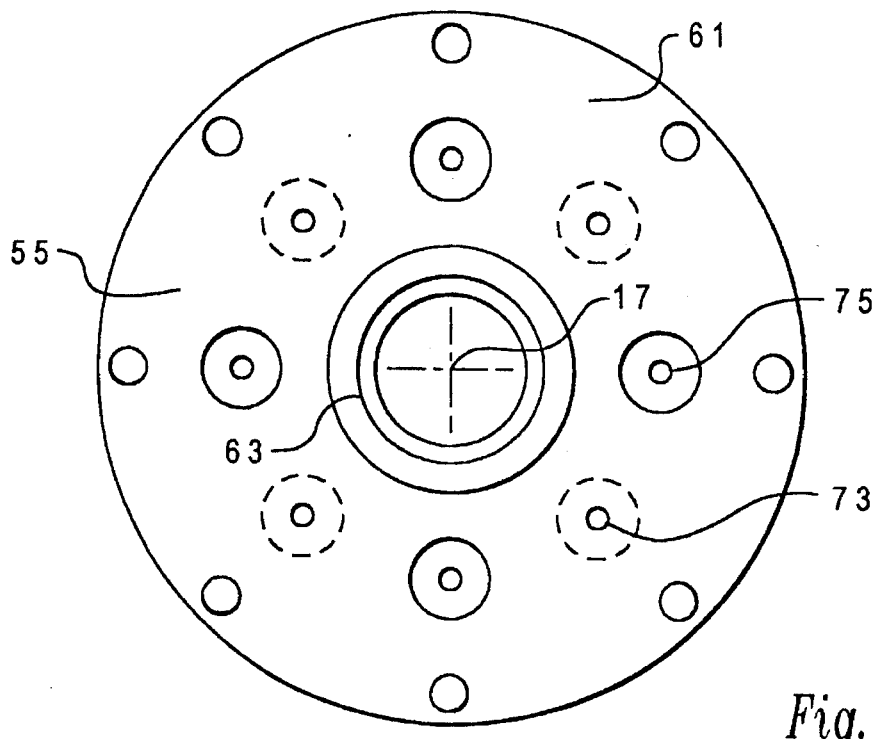
FIG. 2 is a side elevational view of a support bracket for securing the rotary electrical connector for rotating with a portion of the electric variable speed drive of FIG. 1.

FIG. 2 is a side elevational view of support bracket 55, and depicts a fan means provided by tapered holes 73 and 75, which extend through flat plate portion 61. Four tapered holes 73 are equally spaced in a circular pattern around central axis 17, and extend with an inward taper into plate portion 61. An inward taper is herein defined by tapered holes 73 having a diameter which increases as it moves inward into the interior of drive 11. Thus, the interior portion of holes 73 is larger than the exterior portion of holes 73. Four of tapered holes 75 are equally spaced about central axis 17, each located between two of the tapered holes 73. Tapered holes 75 are outwardly tapered. An outward taper is herein defined by holes 75 having a larger diameter in moving outward from the interior of drive 11. Thus, the exterior diameter of holes 75 is larger than the interior diameter of holes 75.

Tapered holes 73 and 75 operate to provides a fan means based on the principle of a venturi effect. As plate portion 61 of support bracket 55 rotates about central axis 17, air will be drawn interiorly into drive 11 through tapered holes 73, in the direction indicated by arrow 79. Rotation of plate portion 61 about central axis 17 will also, by the venturi effect, draw air exteriorly from within drive 11 and through tapered holes 75, in the direction indicated by arrow 81. Thus, tapered holes 73 and 75 provide a fan means for drawing air through plate portion 61 to prevent the temperature within the interior of hub member 23 from reaching a maximum temperature limit and overheating rotary electrical connector 57.

Support bracket 55 further includes gear 83, which includes teeth that provide a digitated speed means for detecting the speed of rotation of driven member 15 about central axis 17. Magnetic pickup 85 is utilized for detecting rotation of the teeth of gear 83. Magnetic pickup 85 is mounted within stationary housing 87.

Stationary housing 87, which may be formed from an electrical junction box, is mounted to the end of cylindrical portion 63 of support bracket 55 by bearing 89. Terminal block 91 is included within stationary housing 87 for wiring to electrical connector 57 and magnetic pickup 85, as well as providing an electric connection for other devices which may be included within stationary housing 87 or drive 11. Conduit 93 extends from the exterior of stationary housing 87, and in this embodiment of the present invention prevents rotation of housing 87 which may be urged by friction in bearing 89. An electric connector 95 extends from stationary end of rotary electrical connector 57 to terminal block 91. Electric connector 95 prevents a stationary portion of rotary electrical connector 57 from rotating.

Heater 97 and temperature sensitive member 99 are included within stationary housing 87 and connected to terminal block 91, which interconnects heater 97 and temperature sensitive member 99 to power leads. Temperature sensitive member 99 is utilized for determining when electric power will be passed through heater 97 so that the interior temperature of stationary housing 87 will not drop below a predetermined minimum temperature. Temperature sensitive member 99 may be a standard thermostat member, such as a bimetallic element, or some other member that will pass electric current through heater 97 when a predetermined minimum temperature is approached.

Lead wires 98 extend from rotary electrical connector 57 to electric coil 49 within driven member 15 for passing electric current therebetween.

Figure 3:
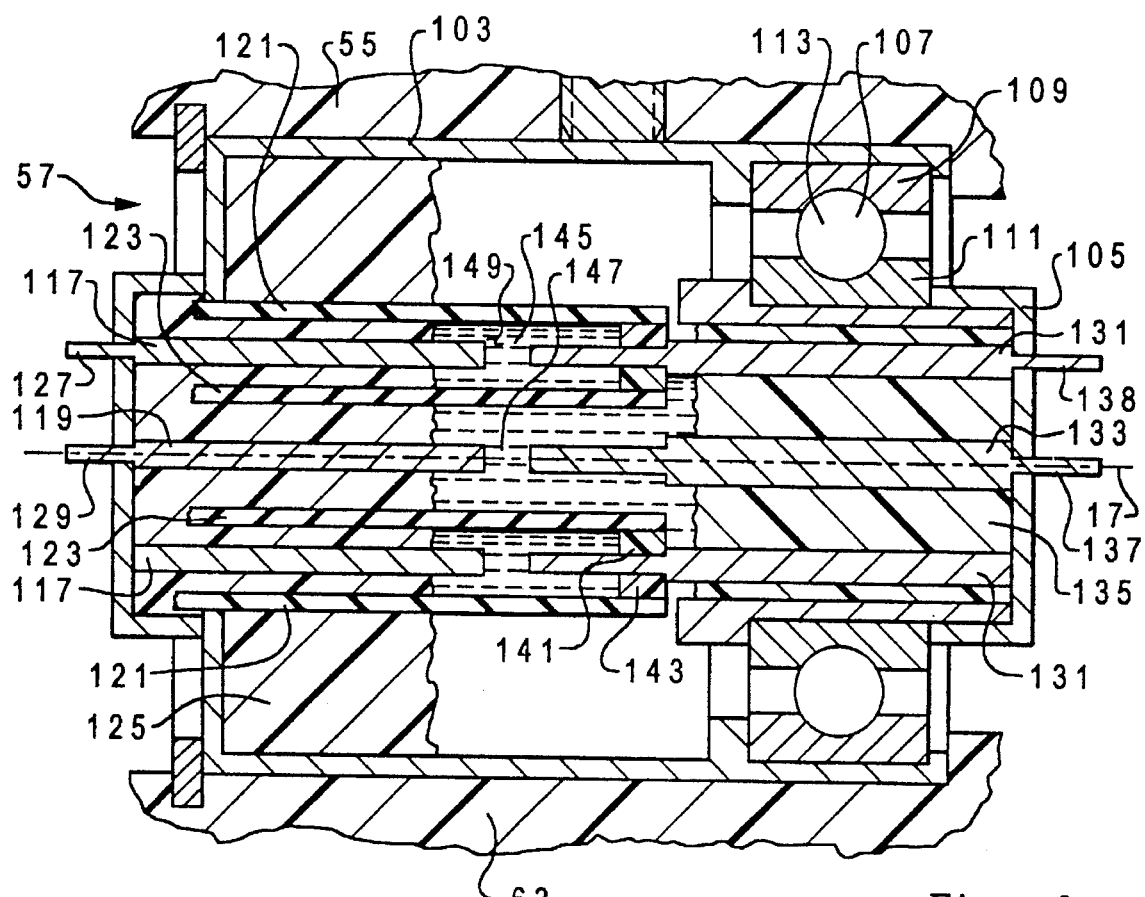
FIG. 3 is a longitudinal section view depicting a rotary electrical connector according to the present invention.

FIG. 3 is a longitudinal section view of rotary connector 57, which is used to provide rotary electrical connector 57 of FIG. 1. Rotary electrical connector 57 is available from Mercotac, Inc., of Carlsbad, Calif. Rotary connector 57 includes rotary housing 103 and stationary housing 105 which are rotatably secured together by bearing means 107. Outer bearing race 109 is mounted to rotary housing 103, and inner bearing race 111 is mounted to stationary housing 105 with ball bearings 113 extending therebetween to provide bearing means 107. Rotary housing 103, stationary housing 105, and bearing means 107 are concentrically disposed around central axis 17.

Rotary contact ring 117 and rotary contact rod 119 are conductive elements which are interiorly secured within rotary housing 103, and concentrically disposed around central axis 17. Rotary seal rings 121 and 123 are also concentrically disposed around central axis 17, and provide a non-conductive seal means, and an electrical insulation means, with rotary seal ring 121 extending exteriorly about rotary contact 117. Rotary seal ring 123 is concentrically disposed around rotary contact rod 119. A non-conductive potting material 125 fills a portion of the void space within rotary housing 103, and also provides an electrical insulation means. The non-conductive potting material 125 seals between rotary housing 103, rotary contact ring 117, rotary contact rod 119, and rotary seal rings 121 and 123. Rotary contact connections 127 and 129 extend from the end of rotary housing 103, and are mounted to rotary contact ring 117 and rotary contact rod 119, respectively.

Stationary contact ring 131 and stationary contact rod 133 are conductive elements which are interiorly secured within stationary housing 105, and concentrically disposed around central axis 17. A non-conductive potting material 135 fills a portion of the void space within stationary housing 105, and provides an electrical insulation means. The non-conductive potting material 135 seals between stationary housing 105, stationary contact ring 131, and stationary contact rod 133. Stationary contact connections 137 and 138 extend from the end of stationary housing 105, and are mounted to stationary contact ring 131 and stationary contact rod 133, respectively.

Seals 141 and 143 are stationary seal rings which each extend circumferentially around central axis 17. Seal 141 is mounted within an interior circumference of stationary contact ring 131, and seals between stationary contact ring 131 and an exterior of rotary seal ring 123. Seal 143 is mounted to an exterior circumference of stationary contact ring 131, and seals between stationary contact ring and an interior of rotary seal ring 121. In the preferred embodiment of the present invention, seals 141 and 143 are provided by elastomeric face seals, such as those used in hydraulic and automotive types of applications. It should also be noted that seals 141 and 143 are schematically depicted in FIG. 3. Seals 141 and 143 do not rotate, but rather provide a static sealing contact with stationary ring 131, and a sliding sealing contact with rotary seal rings 123 and 121, respectively.

An annular chamber 145 is defined within rotary connector 57 by seals 141 and 143, and extends circumferentially around central axis 17. Annular chamber 145 is defined by an interior of rotary seal ring 121, an exterior of rotary seal ring 123, potting material 125 and 135, seals 141 and 143, and the end tips of rotary contact ring 117 and stationary contact ring 131. Annular chamber 145 extends completely around central axis 17. An inner chamber 147 extends completely about central axis 17, and is defined by the interior surface of rotary seal ring 123, potting material 135, seal 141, and the end tips of rotary contact rod 119 and stationary contact rod 133.

Annular chamber 145 and inner chamber 147 are sealed for containing conductive fluid 149 therein. In the preferred embodiment of the present invention, conductive fluid 149 is a mixture of liquids which includes liquid mercury. Conductive fluid 149 directly contacts the end tips of rotary contact ring 117 and stationary contact ring 131 for passing electric current therebetween. Conductive fluid 149 within inner chamber 147 directly contacts the end tips of rotary contact rods 119 and stationary contact rod 133 for passing electric current therebetween. Electric connections 129 and 137 are electrically connected by the end tips of rods 119 and 133 providing wetted surfaces which are electrically connected by directly contacting conductive fluid 149 within inner chamber 147. Electric connections 127 and 138 are electrically connected by the end tips of rings 117 and 131 providing wetted surfaces which are electrically connected by directly contacting conductive fluid 149 within annular chamber 145. Thus, conductive fluid 149 provides a fluidic electrical connection between electrically conductive members by directly contacting the members and passing current therebetween. Rotary housing 103 is free to rotate about stationary housing 105, and rotates with support bracket 55.

Operation of electric variable speed drive 11 is now described. Hub member 23 is clamped to the shaft of a motor by means of mechanical input portion 29 being reduced by pulling tapered rings 33 and 35 towards each other over tapered sleeve 31. The pulley sheaves of mechanical output drive portion 47 are connected by means of pulley belts for transmitting mechanical power therefrom. Input member 13 will rotate with the drive shaft of an electric motor. Electric current is passed from terminal block 91 through the wires of connector 95, through rotary electrical connector 57 and wires 98, to electric coil 49. The electric current passing through electric coil 49 creates a magnetic field directed through pole means 51, across air gap 53, and into magnetic armature 25.

The magnetic field generated from current passing within electric coil 49 creates eddy currents within armature 25, which in turn generate an induced magnetic field of opposite polarity to that induced by current passing through electric coil 49. The generated and induced magnetic fields together magnetically couple armature 25 to electric coil 49 and pole means 51. The extent of the magnetic coupling between input member 13 and driven member 15 is determined by the amount of electric current passing through electric coil 49. With a larger value for the current passing through electric coil 49, the greater the magnetic coupling between pole means 51 and armature 25, and thus the greater the extent of coupling between driven member 15 and input member 13. Thus, as current passing within electric coil 49 increases, the speed of rotation of driven member 15 approaches that of input member 13, until a maximum speed is reached for driven member 15.

Digitated speed means, gear 83, rotates at the same speed as driven member 15 and mechanical output drive portion 47. Magnetic pickup 85 detects the teeth of gear 83 passing by an end tip of pickup 85 and emits an electric signal having a frequency which is proportional to the rotational speed of driven member 15. Thus, the output speed of driven member 15 may be detected and utilized for controlling the electric current passing through coil 49 to vary the magnetic coupling between magnetic pole means 51 and armature 25, or driven member 15 and input member 13.

Referring to FIG. 3, housing 103 is secured within central bore 65 of support bracket 55 so that rotary housing 103 is mounted to driven member 15. Stationary housing 105 is secured in a stationary position. As the electric current passing through coil 49 increases, and driven member 15 is magnetically coupled to input member 13, driven member 15 rotates and causes housing 103 to rotate, along with rotary contact ring 117, rotary contact rod 119, and rotary seal rings 121 and 123, with rotary housing 103. Stationary housing 105 is held in place to hold stationary contact ring 131 and stationary contact rod 133 in a stationary position.

The end tips of rotary contact ring 117 and stationary contact ring 131 extend within annular chamber 145 in direct contact with conductive fluid 149, which passes electric current between rotary contact ring 117 and stationary contact ring 131. The end tips of rotary contact rod 119 and stationary contact rod 133 extend within the conductive fluid 149 within inner chamber 147, and the electric current passes through the conductive fluid 149 between rotary contact rod 119 and stationary contact rod 133. The electric current is passed from connection 138 through rotary connector 57 to electric contact 127, then through coil 49, back to electrical connector 129 through rotary connector 57, and to electrical connector 137 for passing to a stationary power source to provide the electric current for magnetically coupling input member 13 to driven member 15.

Rotation of plate portion 61 of support bracket 55 about central axis 17 draws air through tapered holes 75 and into drive 11, in the direction indicated by arrow 81. Rotation of plate portion 61 about central axis 17 will also draw air exteriorly from within drive 11 and through tapered holes 73, in the direction indicated by arrow 79. Air is forced to flow through tapered holes 73 and 75 because of the shape of holes 73 and 75 and the principle of venturi effect. Circulating air through tapered holes 75, into drive 11, and then out through tapered holes 53 prevents the temperature within the interior of hub member 23 from reaching a maximum temperature limit and overheating rotary electrical connector 57.

It should be noted that in other embodiments of the present invention, a single pole connector may be used rather than a two pole connector, such as rotary connector 57 of FIG. 3. Other embodiments of the present invention may also utilize fan means which are different from that provided by tapered holes 73 and 75 through plate portion 61 of support bracket 55. For example, fan blades similar to fan blades 27 of hub member 23 may be mounted to either input member 13 or driven member 15 for drawing air through holes provided in drive 11 and interiorly about rotary electrical connector 57. Further, support bracket 55 may be formed of metal, rather than glass filled polyester, and other types of insulation means may be used to prevent heat from transferring from hot portions of drive 11 to rotary electrical connector 57. Conductive fluid 149 may be provided by fluids other than mercury, such as a gallium alloy, or an electrolytic solution.

The present invention has advantages over prior art electric variable speed drives. Periodic maintenance of drives made according to the present invention is no longer required to replace brushes or repair commutator ring wear. The fluid contact means of the present invention does not have the wear problems that are associated with pressing a solid brush into a rotating slip ring.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

We claim:

1. In an electric variable speed drive for magnetically coupling an input member to an output member for transferring mechanical power therebetween, the drive including bearing means for rotatably securing the input and output members for coaxially rotating around a common axis, an electric coil and magnetic pole means included with one of the input and output members, and an armature included with the other of the input and output members, wherein electric current passed through the electric coil determines the extent of magnetic coupling between the magnetic pole means and the armature to determine relative rotational speeds between the input and output members, the improvement comprising:

rotary contact means mounted to the one of the input and output members which includes the electric coil for rotation therewith, the rotary contact means having an interiorly defined fluid chamber which extends around the common axis with a concave shape having a closed inner end and an open outer end which are spaced apart along the common axis;

stationary contact means having a stationary contact coaxially disposed around the common axis and extending through the ope n outer end of the fluid chamber, the stationary contact being secured in fixed relation with and electrically connected to a stationary power source;

sliding contact sealing means extending between the rotary contact means and the stationary contact means for sealing the open outer end of the fluid chamber;

a rotary contact included within the rotary contact means and mounted to the one of the input and output members which includes the electric coil, to retain the rotary contact in a fixed spatial relation with and electrically connected to the electric coil, wherein the rotary contact is adapted for rotating about the common axis in a spaced apart relation to the stationary contact; and a conductive fluid disposed within the fluid chamber in direct fluid communication with both the stationary and rotary contacts, wherein the conductive fluid electrically connects between the stationary and rotary contacts to provide an electrical path for passing the electric current between the stationary power source and the electric coil.

2. The electric variable speed drive of claim 1, wherein the conductive fluid comprises a liquid.

3. The electric variable speed drive of claim 1, wherein the conductive fluid comprises liquid mercury.

4. The electric variable speed drive of claim 1, further comprising:

a second stationary contact included within the stationary contact means and secured in fixed relation with and electrically connected to the stationary power source;

a second rotary contact included within the rotary contact means and mounted to the one of the input and output members which includes the electric coil, to retain the second rotary contact in fixed relation with and electrically connected to the electric coil;

wherein the second rotary contact is adapted for rotating about the common axis in a spaced apart relation to the second stationary contact;

a sealed annular fluid chamber disposed within the rotary contact means and extending between the second stationary and rotary contacts;

a conductive fluid disposed within the sealed annular fluid chamber in fluid communication with the stationary and rotary contacts; and wherein the conductive fluid electrically connects between the second stationary and second rotary contacts to complete the electric circuit for passing the electric current between the stationary power source and the electric coil.

5. The electric variable speed drive of claim 1, further comprising:

insulating means for maintaining the temperature of the conductive fluid below a maximum operating temperature limit.

6. The electric variable speed drive of claim 1, further comprising:

fan means mounted to one of the input and output members for rotating therewith and forcing air to pass in the vicinity of the stationary and rotary contacts to maintain the temperature of the conductive fluid below a maximum operating temperature limit.

7. The electric variable speed drive of claim 1, further comprising:

heater means secured to the drive proximate to the rotary electrical connector for maintaining the temperature of the conductive fluid above a minimum operating temperature limit.

8. The electric variable speed drive of claim 1, further comprising:

bearing means extending directly between the rotary contact means and the stationary contact means for aligning the rotary contact means with the stationary contact means and for relative rotation therebetween.

9. In an electric variable speed drive for magnetically coupling an input member to an output member for transferring mechanical power therebetween, the drive including bearing means for rotatably securing the input and output members for coaxially rotating around a common axis, an electric coil and magnetic pole means included with one of the input and output members, and an armature included with the other of the input and output members, wherein electric current passing through the electric coil determines the extent of magnetic coupling between the magnetic pole means and the armature to determine relative rotational speeds between the input and output members, the improvement comprising:

a rotary electrical connector having a stationary contact, a rotary contact adapted for rotating about the common axis in a spaced apart relation to the stationary contact, a housing within which is defined a fluid chamber extending with a concave interior shape having a closed inner end and an open outer end which are spaced apart along the common axis, and a conductive fluid disposed within the fluid chamber in direct contact with the stationary and rotary contacts;

wherein one of the stationary and rotary contacts is disposed concentrically around the common axis, extends through the open outer end of the fluid chamber and directly contacts the conductive fluid within the fluid chamber, and the other of the stationary and rotary contacts is fixedly mounted to the fluid chamber and is in direct contact the conductive fluid;

sliding contact sealing means sealingly engage the one of the stationary and rotary contacts which extends through the open outer end of the fluid chamber for sealing the open outer end of the fluid chamber to contain the conductive fluid therein;

stationary means securing the stationary contact in fixed relation to a stationary power source, with the stationary contact electrically connected to the stationary power source;

mounting means securing the rotary contact in fixed spatial relation to the electric coil, for rotating around the common axis with the rotary contact electrically connected to the electric coil; and wherein the conductive fluid electrically connects between the stationary and rotary contacts to provide an electrical path for passing the electric current between the stationary power source and the electric coil.

10. The improvement of claim 9, wherein the conductive fluid comprises liquid mercury.

11. The electric variable speed drive of claim 9, further comprising:

insulating means for maintaining the temperature of the rotary electrical connector below a maximum operating temperature limit.

12. The electric variable speed drive of claim 9, further comprising:

fan means mounted to one of the input and output members for rotating therewith to force air over the rotary electrical connector for maintaining the temperature of the rotary electrical connector below a maximum operating temperature limit.

13. The electric variable speed drive of claim 9, further comprising:

electric heater means secured to the drive proximate to the rotary electrical connector for maintaining the temperature of the rotary electrical connector above a minimum operating temperature limit.

14. The electric variable speed drive of claim 9, further comprising:

insulating means included within the mounting means for maintaining the temperature of the rotary electrical connector below a maximum operating temperature limit;

fan means mounted to the member including the electric coil for rotating therewith to force air over the rotary electrical connector; and electric heater means secured to the drive proximate to the rotary connector for maintaining the temperature of the conductive fluid above a minimum operating temperature limit.

15. The electric variable speed drive of claim 9, further comprising:

the conductive fluid comprises mercury;

fan means mounted to the member including the electric coil for rotating therewith to force air over the rotary electrical connector to maintain the temperature of the rotary electrical connector below a maximum operating temperature limit; and electric heater means secured to the drive proximate to the rotary electrical connector maintaining the temperature of the rotary electrical connector above a minimum operating temperature limit.

16. The electric variable speed drive of claim 9, further comprising:

a second stationary contact included within the rotary electrical connector and secured in fixed relation with and electrically connected to the stationary power source;

a second rotary contact included within the rotary electrical connector and mounted to the one of the input and output members which includes the electric coil, to retain the second rotary contact in fixed relation with and electrically connected to the electric coil;

wherein the second rotary contact is adapted for rotating about the common axis in a spaced apart relation to the second stationary contact;

a sealed annular fluid chamber extending between the second stationary and rotary contacts;

a conductive fluid disposed within the sealed annular fluid chamber in fluid communication with the stationary and rotary contacts; and wherein the conductive fluid electrically connects between the second stationary and second rotary contacts to complete the electric circuit for passing the electric current between the stationary power source and the electric coil.

17. The electric variable speed drive of claim 9, further comprising:

bearing means included within the rotary electrical connector, and mounted to both the housing and the one of the stationary and rotary contacts which rotates relative to the housing.

18. In an electric variable speed drive for magnetically coupling an input member to an output member for transferring mechanical power therebetween, the drive including bearing means for rotatably securing the input and output members for coaxially rotating around a common axis, an electric coil and magnetic pole means included with one of the input and output members, and an armature included with the other of the input and output members, wherein electric current passing through the electric coil determines the extent of magnetic coupling between the magnetic pole means and the armature to determine relative rotational speeds between the input and output members, the improvement comprising:

a rotary electrical connector having a stationary contact, a rotary contact adapted for rotating about the common axis in a spaced apart relation to the stationary contact, a sealed chamber extending from the stationary contact to the rotary contact, and a conductive fluid disposed within the sealed chamber in fluid communication with the stationary and rotary contacts;

stationary means securing the stationary contact in fixed relation to a stationary power source, with the stationary contact electrically connected to the stationary power source;

mounting means securing the rotary contact in fixed spacial relation to the electric coil, for rotating around the common axis with the rotary contact electrically connected to the electric coil;

wherein the conductive fluid electrically connects between the stationary and rotary contacts to provide an electrical path for passing the electric current between the stationary power source and the electric coil;

a support bracket mounted to the one of the input and output members which includes the electric coil;

the support bracket having a cylindrical bore extending interiorly therein, wherein the rotary electrical connector is secured within the cylindrical bore for rotating with the support bracket in the fixed spatial relation to the electric coil; and the support bracket further including a plate portion having inwardly and outwardly extending tapered holes passing through the plate portion for circulating air to pass through the drive in the vicinity of the rotary electrical connector for maintaining the temperature of the rotary electrical connector below a maximum operating temperature limit.

19. In an electrical variable speed drive including a hub member adapted for mounting to the shaft of a prime mover, a driven body member rotatably supported on the hub member and having a mechanical output drive portion, an electric coil associated with one of the members, magnetic pole means on the last named member positioned in closely spaced relation to a magnetic armature portion of the other member whereby the extent of coupling between the members is affected by application of electric current to the electric coil, the improvement comprising:

concentrically disposed outer and inner rotary contacts and, concentrically disposed outer and inner stationary contacts, with the outer and inner rotary contacts adapted for rotating about a common axis in a spaced apart relation to the outer and inner stationary contacts;

a sealed annular chamber extending between the outer ones of the rotary and stationary contacts, and having a first portion of a conductive fluid disposed therein which directly contacts the outer ones of the stationary and rotary contacts for electrically connecting therebetween;

a sealed inner chamber extending between the inner ones of the rotary and stationary contacts, and having a second portion of the conductive fluid disposed therein which directly contacts the inner ones of the stationary and rotary contacts for electrically connecting therebetween;

electrical insulation means disposed between the outer and inner ones of the rotary and stationary contacts, and disposed between the sealed annular chamber and the sealed inner chamber for preventing the electric current from passing therebetween;

stationary means securing the outer and inner stationary contacts in fixed relation to a stationary power source, with the outer and inner stationary contacts electrically connected to the stationary power source;

support bracket securing the outer and inner rotary contacts to the one of the members with which the electric coil is associated, to retain the outer and inner rotary contacts in a spatial relation to the electric coil for rotating around the common axis with the outer and inner rotary contacts electrically connected to the electric coil; and wherein the hub member, the driven member and the electric coil rotate around the common axis, and the conductive fluid disposed within the annular and inner sealed chambers provides a fluidic electrical connection for passing the electric current between the stationary power supply and the electric coil.

20. The electric variable speed drive of claim 19, wherein the support bracket comprises a thermal insulating material for preventing heat transfer from the one of the members with which the electric coil is associated, to the conductive fluid.

21. The electric variable speed drive of claim 19, further comprising:

a fan secured to one of the hub and driven members for rotating therewith to force air to pass in the vicinity of the inner and outer rotary and stationary contacts to maintain the temperature of the conductive fluid below a maximum operating temperature limit.

22. The electric variable speed drive of claim 19, wherein the support bracket comprises a fan means formed integrally therein for rotating with the electric coil to force air through the support bracket and in the vicinity of the inner and outer rotary and stationary contacts to maintain the temperature of the conductive fluid below a maximum operating temperature limit.

23. The electric variable speed drive of claim 19, further comprising:

a housing extending around the rotary contact; and electric heater means disposed within the housing for automatically operating to maintain the interior temperature of the housing above a minimum operating temperature limit.

24. The electric variable speed drive of claim 19, further comprising:

a fan secured to one of the hub and driven members for rotating therewith to force air through holes in the drive and in the vicinity of the outer and inner rotary and stationary contacts to maintain the temperature of the conductive fluid below a maximum operating temperature limit; and wherein the support bracket comprises a thermal insulating material for preventing heat transfer from the one of the members with which the electric coil is associated, to the conductive fluid.

25. The electric variable speed drive of claim 19, wherein:

the support bracket comprises a thermal insulating material for preventing heat transfer from the one of the members with which the electric coil is associated, to the conductive fluid; and the support bracket further comprises a fan means formed integrally therein for rotating with the electric coil to force air through the support bracket to maintain the temperature of the conductive fluid below a maximum operating temperature limit.

26. The electric variable speed drive of claim 19, further comprising:

a housing extending around the rotary contact;

electric heater means disposed within the housing for automatically operating to maintain the interior temperature of the housing above a minimum operating temperature limit;

wherein the support bracket comprises a thermal insulating material for preventing heat transfer from the one of the members with which the electric coil is associated, to the conductive fluid;

wherein the support bracket comprises a fan means formed integrally therein for rotating with the electric coil to force air through the support bracket to maintain the temperature of the conductive fluid below a maximum operating temperature limit; and wherein the conductive fluid comprises liquid mercury.

27. A method for magnetically coupling between coaxially mounted input and output members to transfer mechanical power and determine relative rotational speeds therebetween, the method comprising the steps of:

providing an electric coil and magnetic pole means on one of the input and output members, an armature on the other of the input and output members;

rotatably and coaxially mounting the input and output members around a common axis of rotation with the magnetic pole means in closely spaced relation to the armature;

mounting a stationary contact means in a fixed relation to a stationary power source, electrically connected to the stationary power source;

mounting a rotary contact means to the one of the members in which the electric coil is included, electrically connected to the electric coil and adapted for rotating around the common axis of rotation in a spaced apart relation to the stationary contact;

providing a fluid chamber within one of the rotary and stationary contact means, having a closed inner end and open outer end which are spaced apart along the common axis, the open outer end being concentrically disposed around the common axis, wherein the other of the stationary and rotary contact means extends through the open outer end and into the fluid chamber;

providing a conductive liquid within the fluid chamber, extending between the stationary and rotary contact means for conducting electric current therebetween, and a sliding contact seal for engaging between the stationary and rotary contact means at the open outer end of the chamber to seal the conductive fluid within the chamber;

slidingly engaging the sliding contact seal between the stationary and rotary contact means at the open outer end of the fluid chamber to contain the conductive liquid within the fluid chamber in direct fluid contact with both the stationary and rotary contacts, wherein the conductive liquid electrically connects between the stationary and rotary contacts to complete an electrical circuit for passing the electric current between a stationary power source and the electric coil; and varying the current to the electric coil to determine the extent of magnetic coupling between the magnetic pole means and the armature, to determine the relative rotational speeds between the mechanical input and output members at which power is transferred therebetween.

28. The method of claim 27, further comprising the step of:

passing forced air across a vicinity of the rotary and stationary contact means to maintain the temperature of the conductive liquid below a maximum operating temperature limit.

29. The method of claim 27, further comprising the step of:

applying heat to the vicinity of the rotary and stationary contact means to maintain the temperature of the conductive liquid above a minimum operating temperature limit.

30. The method of claim 27, further comprising the steps of:

passing forced air a vicinity of the rotary and stationary contact means to maintain the temperature of the conductive liquid below a maximum operating temperature limit; and applying heat to the vicinity of the rotary and stationary contact means to maintain the temperature of the conductive liquid above a minimum operating temperature limit.

* * * * *